United States Patent
Gochev

(10) Patent No.: US 10,158,238 B2
(45) Date of Patent: Dec. 18, 2018

(54) HELPS—HYBRID ELECTRIC LIGHT POLE SYSTEM

(71) Applicant: Kiril Stefanov Gochev, Grayslake, IL (US)

(72) Inventor: Kiril Stefanov Gochev, Grayslake, IL (US)

(73) Assignee: KIRIL STEFANOV GOCHEV, Grayslake, IL (US)

( * ) Notice: Subject to any disclaimer, the term of this patent is extended or adjusted under 35 U.S.C. 154(b) by 0 days.

(21) Appl. No.: 14/718,082

(22) Filed: May 21, 2015

(65) Prior Publication Data

US 2016/0345399 A1 Nov. 24, 2016

(51) Int. Cl.
| | |
|---|---|
| *H05B 33/08* | (2006.01) |
| *H02J 7/00* | (2006.01) |
| *H02J 7/35* | (2006.01) |
| *H02J 1/10* | (2006.01) |
| *H05B 37/00* | (2006.01) |

(52) U.S. Cl.
CPC ............ *H02J 7/0029* (2013.01); *H02J 1/108* (2013.01); *H02J 7/35* (2013.01); *H05B 37/00* (2013.01); *H02J 7/0068* (2013.01); *H02J 2007/0037* (2013.01); *Y02B 20/48* (2013.01); *Y02B 20/72* (2013.01)

(58) Field of Classification Search
CPC ... H05B 33/0845; H05B 37/00; H02J 7/0029; H02J 7/0068; H02J 7/35; H02J 2007/0037; H02J 1/108; Y02B 20/72; Y02B 20/48
See application file for complete search history.

(56) References Cited

U.S. PATENT DOCUMENTS

| | | | | |
|---|---|---|---|---|
| 6,204,645 B1* | 3/2001 | Cullen | ...................... | G05F 1/67 320/102 |
| 7,789,524 B2* | 9/2010 | Anderson | ................. | F21L 4/08 362/183 |
| 8,106,593 B2* | 1/2012 | Nevins | .................... | F03D 9/007 315/149 |
| 8,282,236 B2* | 10/2012 | Pelken | ...................... | F03D 3/02 362/183 |
| 8,847,425 B2* | 9/2014 | Jordan, Sr. | .............. | F03D 9/007 290/44 |

(Continued)

FOREIGN PATENT DOCUMENTS

WO WO 2007052960 A1 * 5/2007 ............. H05B 37/00

*Primary Examiner* — Michael C Zarroli

(57) ABSTRACT

A Hybrid Electric Light Pole System (HELPS) generating energy from wind and solar and collecting it in storage or transferring it to the grid and, supplying uninterrupted power to light bulb(s) (107) is disclosed. The system comprises a monopole (106) and a wind turbine (101) attached on the top of the pole, two leaves (103) symmetrically attached to the pole with "C" shape branches (105), where each "C" shape (105) crosses the pole (106) at two support points. The top surface of the leaves is designed to handle flexible solar panel(s) (104). Some embodiments may be equipped with additional rigid solar panel(s) (102) if required. The bottom surface of the leaves is designed to handle the light bulb(s) (107). The generator—wind/solar and the load—lightbulbs are wired to the controller (109), capable of maintaining battery (110) charge and turning ON and OFF the lights based on the preset parameters.

3 Claims, 4 Drawing Sheets

(56) References Cited

U.S. PATENT DOCUMENTS

| | | | | |
|---|---|---|---|---|
| 2010/0133850 A1* | 6/2010 | Winkler | ................. | F03D 3/005 |
| | | | | 290/55 |
| 2013/0234605 A1* | 9/2013 | Burrows | ............ | H05B 33/0803 |
| | | | | 315/158 |
| 2014/0036521 A1* | 2/2014 | Elliott | .................. | F21V 21/116 |
| | | | | 362/459 |
| 2015/0280489 A1* | 10/2015 | Curlett | ............... | H05B 37/0218 |
| | | | | 307/66 |

* cited by examiner

HELPS—HYBRID ELECTRIC LIGHT POLE SYSTEM

FIELD OF THE INVENTION

One commonly useful embodiment of the Invention narrates to the following field, while the Invention may also relate to other fields and uses. The Invention may have various embodiments and variations. One aspect of the Invention is as a self-sustainable street lighting system.

BACKGROUND OF THE INVENTION

Existing street lighting systems have a number of disadvantages including heat dissipation; low light rendering factor, power factor and efficiency. Further, increasing of time required to start up in a cold weather, dependence on connection to the centralized electric grid and operable only on high voltage alternative currency. The present invention provides an art design of self-sustainable hybrid street lighting system in which at least some of the abovementioned problems are alleviated or fully remedied.

SUMMARY OF THE PRESENT INVENTION

1.) In accordance with one aspect of the present invention, provided is a self-sustainable hybrid electric light pole system characterized by adequate mono pole, which comprise top mounted vertical axis wind turbine capable to utilize energy from the wind and to transform this energy to an electric power.

2.) In accordance with a further aspect of the present invention, provided is a self-sustainable hybrid electric light pole system characterized by vertical axis wind turbine mounted on the top center of the adequate mono pole with adjacent symmetrically attached leaves to the pole, with flat "C" shape branches, where top surface of these leaves is design to handle flexible solar panel, which are capable to utilize energy from the sun and to transform this energy to an electric power. Some embodiments of the system may be equipped with additional ridged solar panel(s), if is required by calculations of designed project.

3.) In accordance with an further aspect of the present invention, provided is a self-sustainable hybrid electric light pole system characterized by vertical axis wind turbine mounted on the top center of the adequate mono pole with adjacent symmetrically attached leaves to the pole, with flat "C" shape branches, where bottom surface of these leaves is design to handle LED bulb, or LED composite module, or LED fixture capable to distribute adequate lux brightness to the surrounding ground surface.

4.) In accordance with a yet further of the present invention, provided is a self-sustainable hybrid electric light pole system characterized by vertical axis wind turbine mounted on the top center of the adequate mono pole with adjacent symmetrically attached leaves to the pole, with flat "C" shape branches with flexible solar panel allocated on the top and LED lighting elements on the bottom and computerized controller attached to the bottom of the monopole or other designated area, which controller is a wired to the wind turbine, solar panels and LED lights with intend to provide effective power management and safe energy distribution.

DESCRIPTION OF THE DRAWINGS

Other features and advantages of the invention will be entirely understood from the following detailed description taken in conjunction with the accompanying drawings in which.

DETAILED DESCRIPTION OF THE INVENTION

Figure 1:
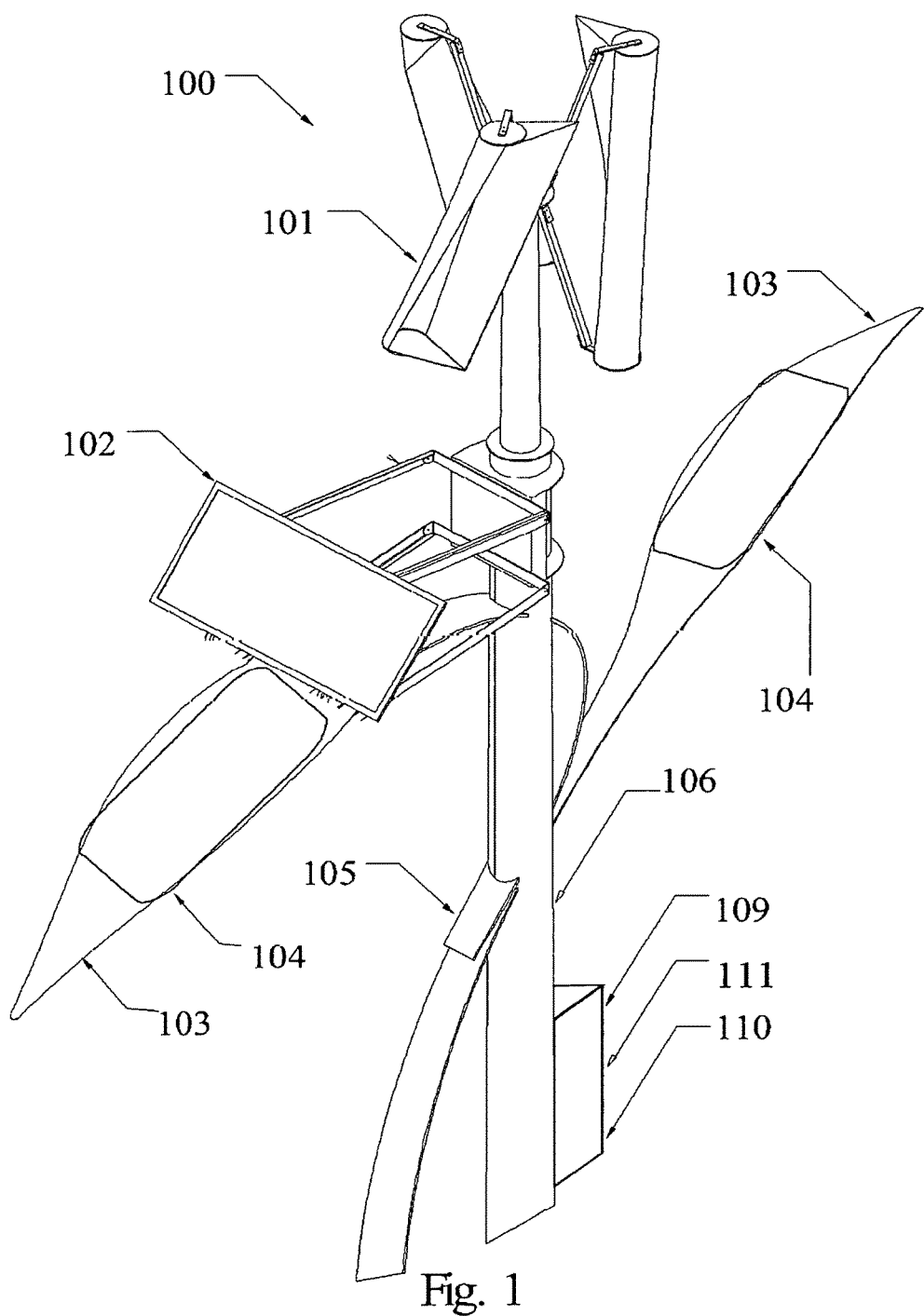
FIG. 1 is a perspective view of the self-sustainable hybrid electric light pole system according to the present invention and includes location note for the controller (109), within which the block chain schematic is represented in detail in FIG. 4.
Figure 2:
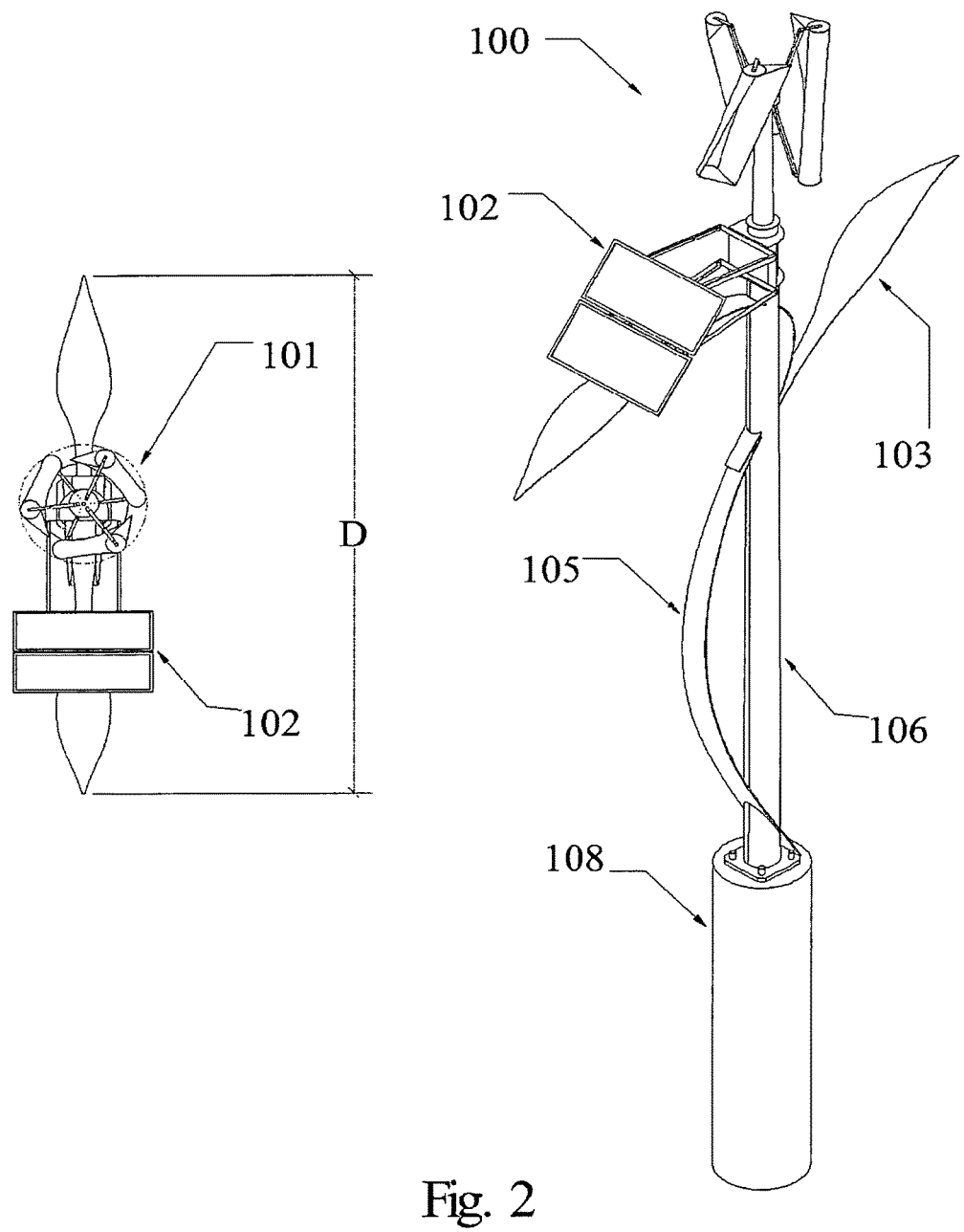
FIG. 2 is a perspective view of the self-sustainable hybrid electric light pole system, which includes adequate representation of the foundation and includes as well a top view of the self-sustainable hybrid electric light pole system according to the present invention.
Figure 3:
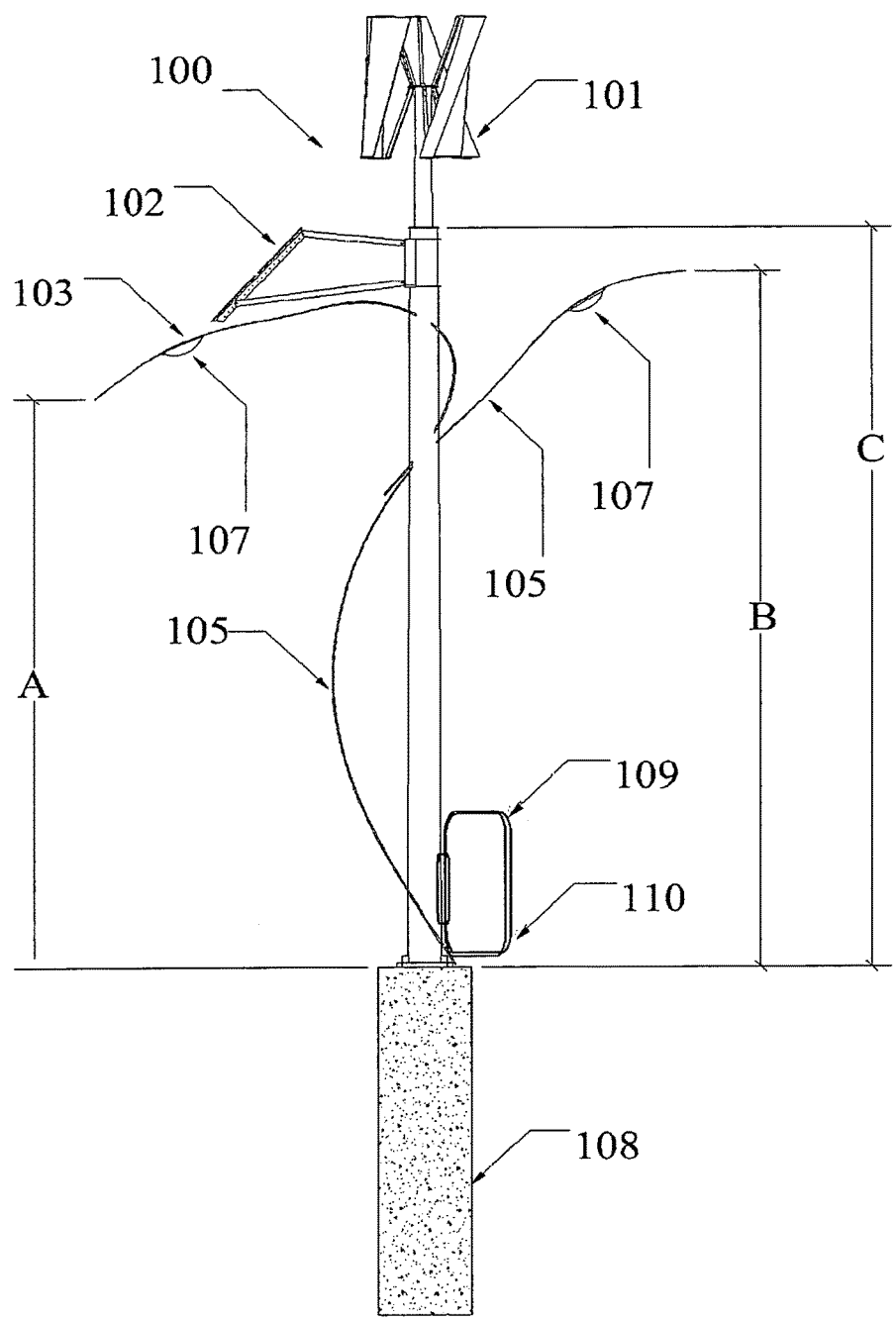
FIG. 3 is a front view of the self-sustainable hybrid electric light pole system, which includes adequate representation of the foundation according to the present invention.
Figure 4:
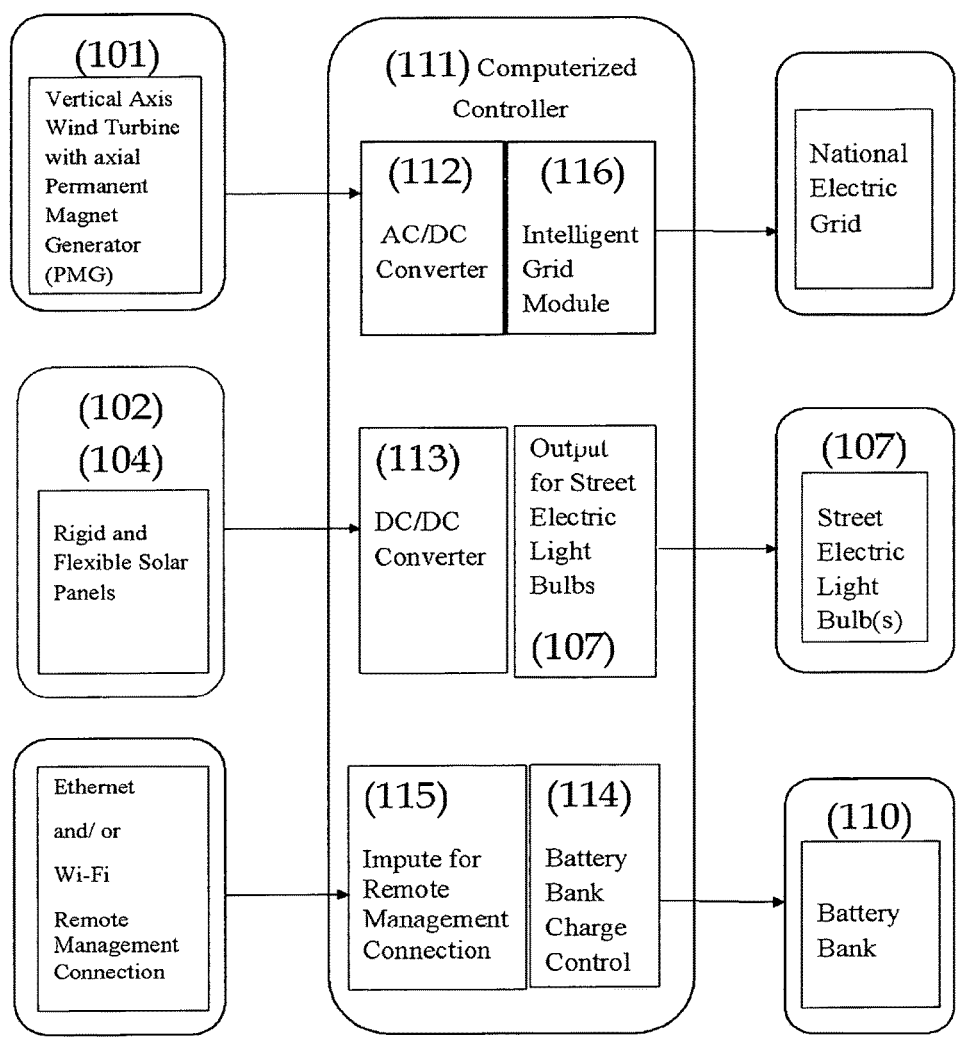

FIGS. 1 to 3 and the following description represent certain examples to inform those knowledgeable in the art how to make and use the best means of the invention. For the purpose of educating inventive principles, some conventional aspects have been simplified or omitted. Those knowledgeable in the art will appreciate variations from these examples that fall within the scope of the invention. Those knowledgeable in the art will appreciate that the features described below can be combined in various ways to form multiple variations of the invention. As a result, the invention is not limited to the specific examples described below, but only by the claims and their equivalents.

FIG. 1 shows a perspective view of the self-sustainable hybrid, electric light pole system (HELPS) (100) according to an embodiment of the invention. It should be appreciated that the wiring details of the HELPS (100) components are not shown for the purpose of clarity. The wiring position and wire gauge used in the system may comprise any suitable parameters per designed capacity and local authorities cod and regulations. Optional connection to the grid is not shown as it is structured per local district cods and federal regulations.

Referring now to the drawings, the reference numerals which denote similar elements throughout the several views, where is shown and described the invention of a self-sustainable hybrid, electric light pole system (100) capable of generating energy from wind and solar and collecting it in the storage (110) or transferring it to the grid as need it, and which is capable to uphold minimum (but not limited to) overnight supply of energy (for OFF grid design configuration) for uninterrupted work of one or more street electric light bulb(s) (107), distributing to the ground surface lumens equivalent to the brightness of a conventional lighting system or brightness equivalent to the standards and requirements of the local authority.

The self-sustainable hybrid electric light pole system (HELPS) (100) shown in prospective view in FIG. 1, top view in FIG. 2 and front view in FIG. 3 comprises a vertical axis wind turbine (101), in this case 500 W nominal capacity, center balanced hybrid wind turbine with high performance at low wind speed and continues turbulence, which is typical for urban area. The typical wind turbine is equipped with AC axial PMG, which based on the average annual wind speed for the area can be configured in 12 VDC; 24 VDC and 48 VDC systems.

The optional adjustable structure for installation of rigid, up to 300 W solar panels (102), in this case comprise a 100 W mono-crystalline multi cell PV module, which is positioned between 32° to 45° facing south (for a northern hemisphere), which provides ability for maximum performance in 12 month time frame at any temperature condition. The solar panel(s) is connected to the controller with back flow diode to prevent electric current back from the battery.

The leafs (103) and "C" shape branches (105) shown on FIG. 1; FIG. 2 and FIG. 3 are design to allow smooth transition of the HELPS (100) to any natural and/or urban environments. Leafs (103) and "C" shape branches (105) can be painted or coated accordingly to the surrounding habitat. Furthermore, leafs (103) and "C" shape branches (105) can be manufactured from composite material or metal, in this case two symmetric leafs are water jet cute steel, reinforce welded to the mono pole and decoratively painted prior to system installation.

The HELPS (100) further comprises a plurality, in this case two standard flexible mono-crystalline multi cell solar panels (104) shown on the FIG. 1, which are connected in parallel. Each flexible solar panel (104) is wired with back flow diode. Current design allow installation of 100 W maximum capacity over the top of each leaf (103). Leafs (103) are design to allow positioning of the flexible solar panels (104) for maximum performance.

The HELPS (100) further comprises a controller (109), in this case computerize module functioning as an inverter for the wind turbine (101) and solar panels (102) and (104) and as a battery (109) charge controller. At the same time controller (109) allows custom setting for turning LED lights ON and OFF at sun set and sun rise. In addition, there are options to set LED light to work for the determined segments of time at 50% capacity or/and to turn LED lights OFF for a defined duration of time, if desired.

The controller (109) has capability to be programmed as a grid tied inverter, which includes a safe shut down option in case of grid shortage or maintenance.

The controller (109) has capability to slow down the wind turbine speed in OFF grid function and to prevent battery overcharge. As well to perform wind turbine auto stop in critical wind speed.

The controller (109) delivers enhance battery charge management, such as BOOST and BUCK functions. BOOST function—once the wind generators voltage hits lower than the battery voltage, the controller begins to boost the module automatically to charge the battery. BUCK function—once the wind generator voltage is higher than the battery voltage, the controller starts the kick module automatically to charge the battery. All of the controller (109) power management functions, which include, but not limited to wind turbine, solar panel(s), battery and LED lights performance are able for monitoring, adjustment and recording over Ethernet and/or WiFi connection from remount location.

The HELPS (100) further comprises a monopole (106), in this case 25 ft. height, 18 inch diameter at the foundation and 9 inch diameter at the top rounded steel. The diameters and height may very depend on local zoning and geographic specifics.

The HELPS (100) further comprises a foundation (108), in this case 8 ft. deep and 36 inch diameter steel/concrete structure, which may vary for different regions, soil conditions and zoning regulations.

Having in consideration that the principles of the invention have now been made comprehensible in illustrative embodiments, there will be at once obvious to those skilled in the art modifications of structure, proportions, and elements, materials, and components, used in the observe of the invention, which are particularly adapted for specific environments and operating Having in consideration that the principles of the invention have now been made comprehensible in illustrative embodiments, there will be at once obvious to those skilled in the art modifications of structure, proportions, and elements, materials, and components, used in the observe of the invention, which are particularly adapted for specific environments and operating requirements without departing from those principles. This invention is not to be limited by what has been described except as designated by the appended claims.

What is claimed is:

1. A low voltage Direct Current configured system Hybrid Electric Light Pole System (HELPS) capable of altering power from wind (101) and solar (102), (104) and collecting altered capacity of power into a storage (110) or transferring converted power to the electric grid wherein upholding a minimum (but not limited to) overnight supply of power for uninterrupted work of one or more street Solid-State Lighting System(s) is disclosed, the HELPS, further comprising a configuration of:
   a. A vertical axis wind turbine with axial PMG (101) producing wild alternating electricity, characterized by variable frequency (Hz) and current flow (Amps) with spikes up and down, because of wind gusts and inconsistent flow,
   b. The wind turbine with PMG (101) is connected to the Alternate Current (AC) input of an AC to Direct Current (DC) converter (112), which is a component of a computerized controller (111),
   c. Solar modules (102), (104), which are connected with back flow diodes to the input of a DC to DC converter, which is a component of the computerized controller (111), the back flow diode is a semiconductor device, blocking reverse flow of current from a battery through the module at night,
   d. A deep cycle electric capacity storage (110) connected to the output of a charge control module (114), which is a component of the computerized controller (111),
   e. The Street Solid-State Lighting System(s) (107) connected to the output of the computerized controller (111).

2. HELPS according to claim 1, further comprising the computerized controller (111) with capability:
   a. To activate wind turbine's PMG (101) electromagnetic brake (a braking system that uses magnetic attraction generated by an electromagnet as a braking force) when rotating speed exceeds preset safety parameters;
   b. To activate reverse polarity protection, if electric capacity storage (110), or Solid-State Lighting System(s) (107), or solar modules (102), (104) polarity wires are mistakenly switched,
   c. To deliver enhanced electric capacity storage charge management functions, such as BOOST and BUCK, the BOOST function activates once the wind generator's voltage hits lower than the electric capacity storage voltage, and where the controller begins to BOOST the module automatically to charge the electric capacity storage, the BUCK function activates once the wind generator voltage is higher than the battery voltage, the controller starts the BUCK function automatically to charge the electric capacity storage,
   d. To slow down the wind turbine speed and to prevent electric capacity storage overcharge,
   e. To permit Ethernet and/or WiFi connection from remote location for remote management functions (115), which include, but not limited to wind turbine, solar modules, electric capacity storage and Solid-State Lighting System(s) performance, monitoring, adjustment and recording.

3. HELPS according to claim 2, further comprising the computerized controller (111) with further capability to operate this system in Grid (national electric) Tied Configuration via Intelligent Grid module/component:
   a. The Intelligent Grid module maintains switching from OFF grid to Grid Tied mood when produced energy is over electric capacity storage nominal limit,
   b. The Intelligent Grid module maintains monitoring and record outgoing/incoming energy between the Grid and HELPS,
   c. The Intelligent Grid module maintains disengagement of the Grid tied connection, if grid is shut down.

\* \* \* \* \*